Feb. 20, 1951 — O. A. KEHLE — 2,542,145
CONTROL DEVICE
Filed July 15, 1948 — 3 Sheets-Sheet 1
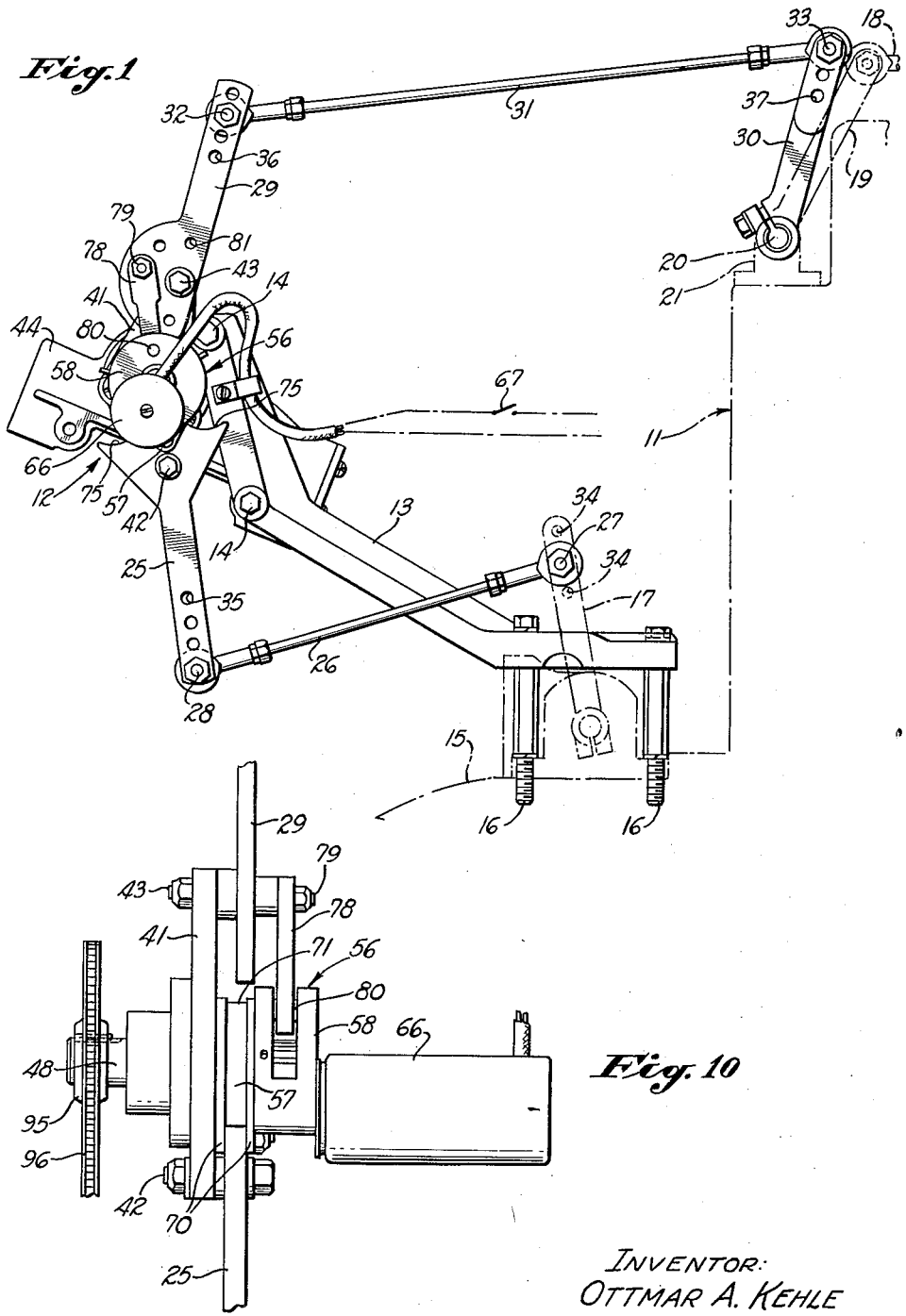
Fig.1
Fig.10
INVENTOR:
OTTMAR A. KEHLE
BY HIS ATTORNEYS
HARRIS, KIECH, FOSTER & HARRIS

Feb. 20, 1951     O. A. KEHLE     2,542,145
CONTROL DEVICE
Filed July 15, 1948     3 Sheets-Sheet 2
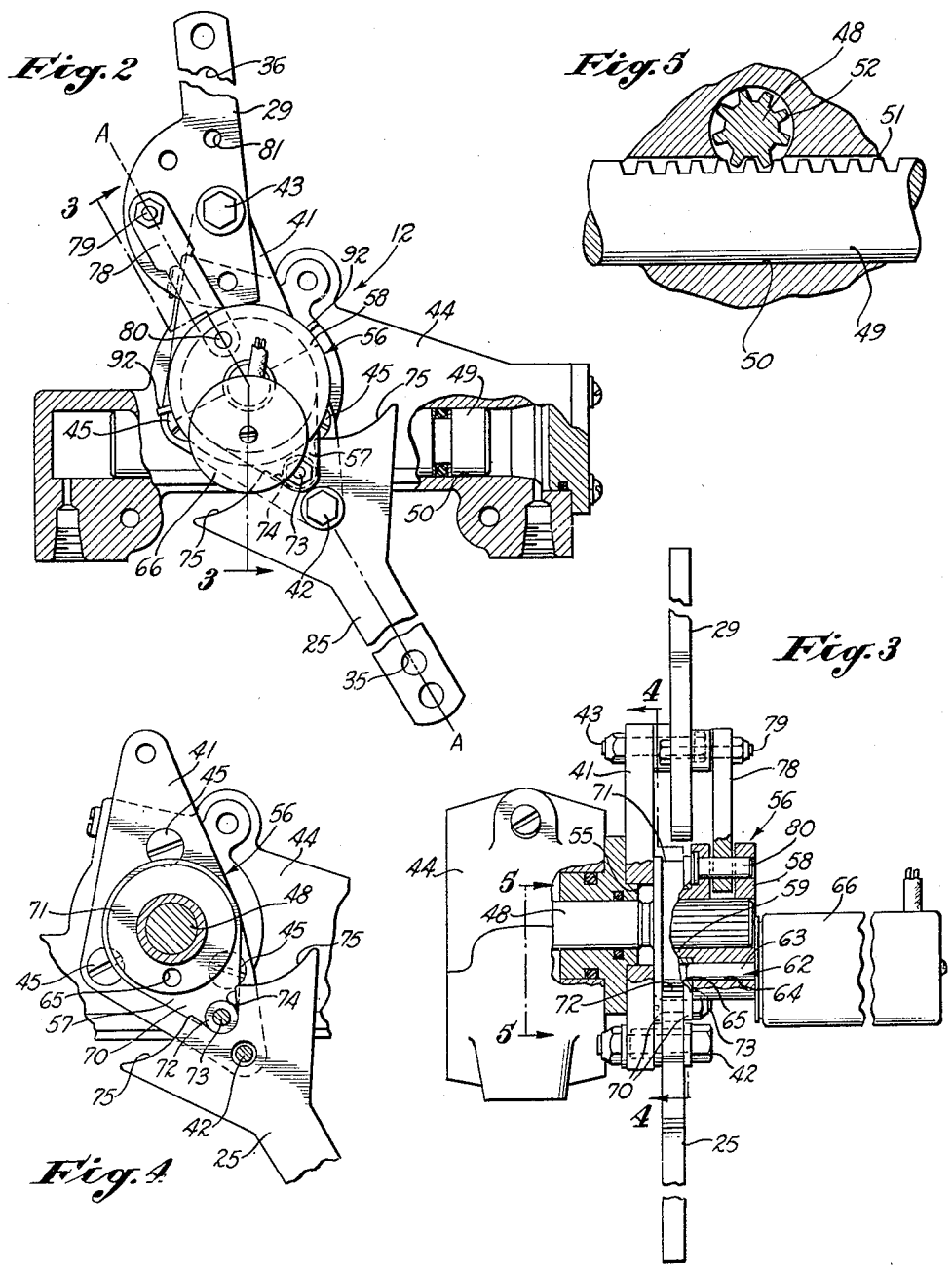
INVENTOR:
OTTMAR A. KEHLE
BY HIS ATTORNEYS
HARRIS, KIECH, FOSTER & HARRIS

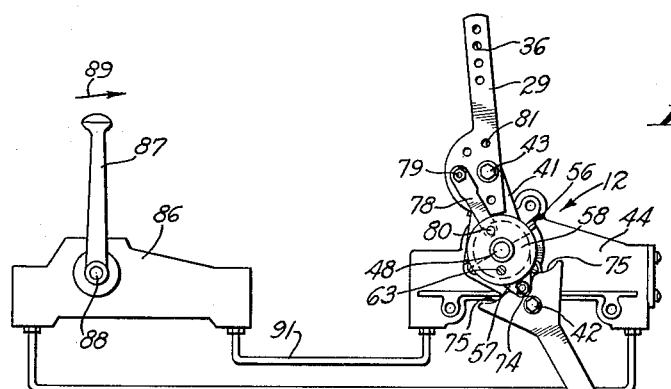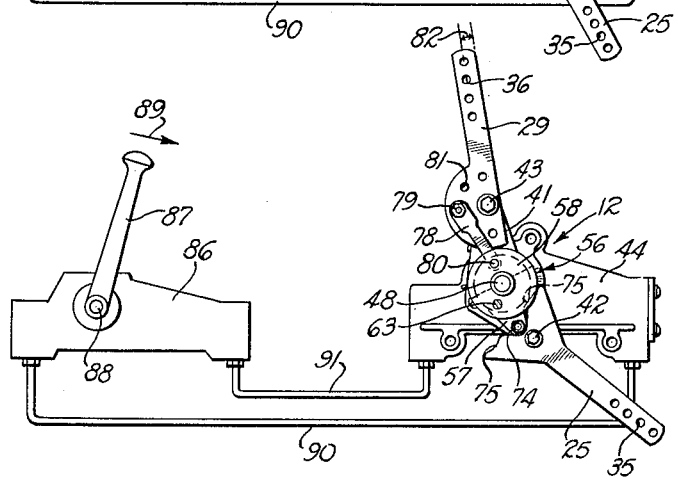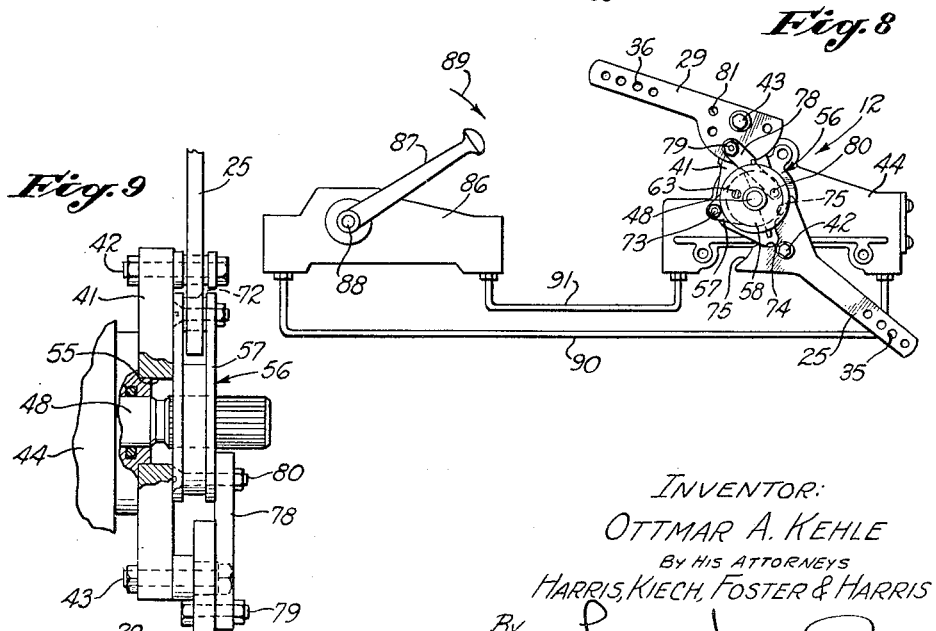

Patented Feb. 20, 1951

2,542,145

UNITED STATES PATENT OFFICE 2,542,145

CONTROL DEVICE

Ottmar A. Kehle, Van Nuys, Calif., assignor to General Metals Corporation, a corporation of California Application July 15, 1948, Serial No. 38,827

15 Claims. (Cl. 192—.096)

My invention relates in general to control devices and, more particularly, to a device for controlling the positions of two movable elements, a primary object of the invention being to provide a device which is adapted to move one of the elements controlled thereby from a first position to a second position substantially without moving the second element, and which is adapted to subsequently move the second element from a first position to a second position without moving the first element.

Another object is to provide a control device which is adapted to move the first element controlled thereby from a first position into either one of a pair of second positions substantially without moving the second element controlled thereby, and which is adapted to subsequently move the second element from its first position to its second position without moving the first element.

An important object of the invention is to provide a control device of the foregoing character which is operable by a single control means, such as a handle or lever, for example.

Another important object is to provide a control device wherein the second controlled element may be moved between its first and second positions independently of the first controlled element.

More specifically, an object of the present invention is to provide a control device which includes first and second control members, the first control member being rotatable from a first, or neutral, position to either one of a pair of second, or operating, positions and being adapted to be connected to the first element to be controlled by the device, and the second control member being rotatable from a first, or initial, position to a second, or advanced, position and being adapted to be connected to the second element to be controlled by the device. A related object is to provide a control device having actuating means for rotating the first control member from its first position into either one of its second positions substantially without rotating the second control member from its first position, and for subsequently rotating the second control member from its first position to its second position without producing further rotation of the first control member.

Still another object is to provide a control device wherein the foregoing sequence of events is reversible, i. e., to provide a control device having actuating means for first rotating the second control member from its second position substantially to its first position without moving the first control member from the second position occupied thereby, and for subsequently rotating the first control member from the second position occupied thereby to its first position substantially without rotating the second control member.

An important object is to provide a control device wherein the aforementioned actuating means comprises relatively rotatable first and second actuating members, or rotors, which are adapted to be connected to the first and second control members, respectively, the first rotor being adapted to actuate the first control member and the second rotor being adapted to actuate the second control member.

Another object is to provide means for rotating the second rotor independently of the first rotor so as to permit rotation of the second control member between its first and second positions without rotation of the first control member.

Still another object is to provide disengageable means for connecting the first rotor to the second rotor so as to render the first rotor rotatable with the second.

Still another object of the invention is to provide a control device wherein the first rotor and the first control member cooperate to provide a Geneva stop mechanism. A related object is to provide a control device wherein the first control member is provided with a notch therein and wherein the first rotor carries an actuating element which is receivable by this notch when the first rotor is between a first, or neutral, position and either one of a pair of second positions. Still another object in this connection is to provide a control device wherein the actuating element carried by the first rotor is withdrawable from the notch in the first control member when the first rotor is rotated from either one of its second positions toward one of a pair of third positions.

An additional object of the invention is to provide a control device wherein the first and second rotors are carried by a shaft adapted to be connected to a suitable operating means, the second rotor being rigidly connected to the shaft and the first rotor being adapted to be rigidly connected thereto by the aforementioned disengageable means.

An object in connection with one embodiment of the invention is to provide a control device wherein the aforesaid operating means for the shaft comprises a hydraulic slave unit which is actuable by a hydraulic master unit having a single, manually operable handle so that the positions of the two control members of the device may be controlled by this single handle.

The control device of the present invention is of particular utility when employed in connection with a marine engine having a clutch which may be shifted from neutral into forward or reverse to drive a propeller in the forward or reverse direction, and I prefer to consider such an application of the invention herein for purposes of illustration, although it will be understood that the invention is susceptible of various other applications and is therefore not to be limited to the specific application considered herein. In operating marine engines of the foregoing character, it is desirable to shift the clutch from neutral into either forward or reverse substantially without advancing the throttle, the throttle being advanced after the clutch has been shifted into the desired position. My invention provides a device which may be employed to control the positions of both the clutch and the throttle of such an engine by connecting the first control member of the device to a lever or other means for shifting the clutch, and by connecting the second control member to the throttle. With the device so connected to the clutch and the throttle of the engine, rotation of the first control member from its first position to one of its second positions results in shifting of the clutch from neutral into either forward or reverse, depending upon the direction of rotation of the first control member, substantially without advancing the throttle, and rotation of the second control member from its first position toward its second position results in advancement of the throttle after shifting of the clutch.

My invention also provides a device which may be employed to control the position of the throttle of such an engine without engaging the clutch. This may be attained by disengaging the aforementioned disengageable means connecting the first and second rotors of the device so that the second rotor may be operated independently of the first to change the position of the throttle of the engine without engaging the clutch, which is an important feature of the invention.

Another important object of the invention is to provide a control device which may be used in connection with a marine engine in the foregoing manner substantially without modifying the structure of the engine.

The foregoing objects of the invention and the advantages suggested thereby, together with various other objects and advantages which will become evident, may be attained through the employment of the exemplary embodiment which is illustrated in the accompanying drawings and which is described in detail hereinafter. Referring to the drawings:

Fig. 1 is a side elevational view illustrating a control device which embodies the invention as installed on an engine;

Fig. 2 is an enlarged, side elevational view of the control device per se, an operating means for the control device being shown partially in section;

Fig. 3 is a view in partial section taken approximately along the broken line 3—3 of Fig. 2;

Figs. 4 and 5 are fragmentary, sectional views which are taken along the broken lines 4—4 and 5—5, respectively, of Fig. 3;

Figs. 6, 7 and 8 are semi-diagrammatic views illustrating the operation of the control device, parts of the device being broken away to illustrate its operation more clearly;

Fig. 9 is a view which is similar to Fig. 3 but which illustrates another embodiment of the control device; and Fig. 10 is a view illustrating another embodiment of an operating means for the control device.

Referring particularly to Fig. 1 of the drawings, I show a marine engine 11 having mounted thereon a control device, indicated generally by the numeral 12, which embodies the invention, the control device being mounted on a bracket 13 by means of bolts 14, or the like. The bracket 13 is mounted on a clutch housing 15 of the engine by means of bolts 16, a clutch (not shown) being disposed within the clutch housing as is well known in the art. The clutch may be shifted from neutral into forward or reverse by means of a clutch control lever 17 so as to drive a propeller shaft (not shown), for example, in either the forward or reverse direction. The engine 11 is also provided with a carburetor (not shown) having a throttle whose position is controlled by a rod 18 connected to a throttle control lever 19, the latter being fixed on a rotatable shaft 20 which is journalled in bearings 21 mounted on the engine.

The control device 12 includes a rotatable first control member 25 which is adapted to be connected to the clutch control lever 17 by a rod 26, the latter being pivotally connected to the clutch control lever at one end by a pivot pin 27 and being pivotally connected to the first control member at its other end by a pivot pin 28. The control device 12 also includes a rotatable second control member 29 which is adapted to be connected to a lever 30 fixed on the shaft 20 carrying the throttle control lever 19 by a rod 31, the latter being connected at one end to the second control member by a pivot pin 32 and being connected at its other end to the lever 30 by a pivot pin 33. Thus, rotational movement of the first control member 25 is communicated to the clutch control lever 17 through the rod 26, and rotational movement of the second control member 29 is communicated to the throttle lever 19 through the rod 31, the lever 30 and the shaft 20. In order to permit varying the relative positions of the clutch control lever 17 and the first control member 25, as may be necessary when the control device 12 is used with engines of different types, the lever 17 and the member 25 are provided with a plurality of holes 34 and 35, respectively, for the pivot pins 27 and 28, respectively. The second control member 29 and the lever 30 are preferably provided with a plurality of holes 36 and 37, respectively, which are adapted to receive the pivot pins 32 and 33, respectively, for a similar purpose.

Considering the control device 12 in more detail with particular reference to Figs. 2, 3 and 4 of the drawings, the first and second control members 25 and 29 are rotatably mounted on a supporting plate 41 by means of suitable shafts which are shown as bolts 42 and 43 in the particular construction illustrated, the axes of rotation of the two control members being substantially parallel. In the particular embodiment under consideration, the supporting plate 41 is mounted on a hydraulic motor, exemplified as a slave unit 44, by means of screws 45 or the like.

As best shown in Figs. 2, 3 and 5 of the drawings, the hydraulic slave unit 44 provides a shaft 48 and includes a piston 49 for rotating the shaft, the piston being adapted to be moved in a cylinder 50 by fluid pressure applied to either end thereof as is well known in the art. The piston 49 may be connected to the shaft 48 in any suitable manner, as, for example, by means of rack teeth 51 formed on the piston and meshed with spur teeth 52 formed on the shaft. The manner in which fluid pressure may be applied to the ends of the piston 49 to rotate the shaft 48 will be discussed in more detail hereinafter.

As best shown in Fig. 3 of the drawings, the shaft 48 is substantially parallel to the axes of rotation of the first and second control members 25 and 29 and projects outwardly from the hydraulic slave unit 44 through an opening 55 in the supporting plate 41 for the control number, the shaft carrying an actuating means, indicated generally by the numeral 56, for rotating the control members. The actuating means 56 comprises relatively rotatable first and second actuating members or rotors 57 and 58 which are operatively connected to the first and second control members 25 and 29, respectively, in a manner to be described in more detail hereinafter. The second rotor 58 is fixed on the shaft 48, as by splines, for example, and the first rotor 57 is journalled on a hub portion 59 of the second rotor so as to permit relative rotation of the two rotors. The control device 12 includes clutch means 62 for releasably connecting the first rotor 57 to the second rotor 58 so as to render the first rotor rotatable with the second, the clutch means 62 being exemplified as a plunger 63 which extends through a hole 64 in the second rotor and which is insertable into a hole 65 in the first rotor to connect the two rotors together. The plunger 63 is withdrawable from the hole 65 in the first rotor 57 by a solenoid 66 to permit rotation of the first rotor relative to the second, the solenoid being adapted to withdraw the plunger 63 from the hole 65 when energized. As indicated in Fig. 1 of the drawings, the solenoid 66 is connected to a suitable source of electricity (not shown) through a normally open switch 67 which may be closed to energize the solenoid and thus withdraw the plunger 63 from the hole 65 in the first rotor 57 to disconnect the latter from the second rotor 58.

As best shown in Figs. 3 and 4 of the drawings, the first rotor 57 includes a pair of arms 70 which are spaced apart axially of the shaft 48 by a cylindrical element 71 and which receive an actuating element, exemplified as a roller 72, therebetween, the roller being rotatably mounted on a bolt 73, or the like. As best shown in Fig. 4 of the drawings, the first control member 25 is provided with a notch 74 therein which is adapted to receive the roller 72, and is provided with a pair of arcuate surfaces 75 which are adapted to engage the surface of the cylindrical element 71.

Assuming that the first rotor 57 is connected to the second rotor 58 by the clutch means 62, it will be apparent that as the shaft 48 is rotated in either the clockwise or the counterclockwise direction so as to rotate the first rotor from the position shown in Figs. 1 to 4 and 6 of the drawings, which position is hereinafter referred to as the first, or neutral, position of the first rotor, the roller 72 rotates the first control member 25 away from the position shown in Figs. 1 to 4 and 6, which position is hereinafter termed the first, or neutral, position of the first control member. Assuming that the first rotor 57 is rotated in the clockwise direction, as viewed in Fig. 6 of the drawings, the roller 72 carried thereby rotates the first control member 25 in the counterclockwise direction. When the first rotor 57 reaches the position shown in Fig. 7 of the drawings, which position is hereinafter referred to as one of the second positions of the first rotor, the first control member 25 will occupy the position shown in Fig. 7, this position of the first control member being referred to hereinafter as one of its second positions. As the first rotor 57 and the first control member 25 reach the second positions thereof shown in Fig. 7 of the drawings, the roller 72 carried by the first rotor leaves the notch 74 in the first control member so that further rotation of the first rotor does not result in further rotation of the first control member. This is illustrated in Fig. 8 of the drawings wherein the first rotor 57 is shown as having been rotated to one of a pair of third positions. It will be noted that when the roller 72 leaves the notch 74 therefor, the arcuate surfaces 75 of the first control member 25 substantially contact the surface of the cylindrical element 71 of the first rotor 57.

The foregoing sequence of events in the operation of the first rotor 57 is reversible, i. e., as the first rotor is rotated in the counterclockwise direction, as viewed in Figs. 6 to 8 of the drawings, from the third position thereof shown in Fig. 8 to the second position thereof shown in Fig. 7, the roller 72 enters the notch 74 in the first control member 25 so that continued rotation of the first rotor from the second position thereof shown in Fig. 7 back to the first position thereof results in rotation of the first control member from the second position thereof shown in Fig. 7 back to the first position thereof.

Similarly, if the first rotor 57 is rotated in the counterclockwise direction from its first position to a second position (not shown) corresponding but opposite to the second position thereof which is illustrated in Fig. 7 of the drawings, the first control member 25 will be rotated in the clockwise direction from its first position to a second position (not shown) corresponding but opposite to the second position thereof which is illustrated in Fig. 7. Continued rotation of the first rotor 57 in the counterclockwise direction to a third position (not shown) corresponding but opposite to the third position thereof which is illustrated in Fig. 8 of the drawings does not result in continued rotation of the first control member. This sequence of events is also reversible.

It will be noted that the intermittent movement of the first control member 25 which is produced by the first rotor 57 is of the Geneva type. Thus, in effect, the first control member 25 and the first rotor 57 cooperate to produce a Geneva stop mechanism.

The second control member 29 is connected to the second rotor 58 by an actuating element, exemplified as a link 78, which is connected to the second control member by a pivot pin 79 and which is connected to the second rotor by a pivot pin 80. If desired, the second control member 29 may be provided with a plurality of holes 81 any one of which is adapted to receive the pivot pin 79 so as to permit adjusting the position of the second control member with respect to the second rotor 58.

As best shown in Fig. 2 of the drawings, the pivot pin 80 is so located with respect to the second rotor 58 that, when the second rotor is in its first position, this pivot pin lies substantially on a line A—A which is perpendicular to and extends between the axis of the pivot pin 79 and the axis of rotation of the second rotor. Consequently, as the second rotor 58 is rotated from a first position, shown in Figs. 1 to 4 and 6 of the drawings, to either one of a pair of corresponding but opposite second positions, one of which is shown in Fig. 7 of the drawings, the pivot pin 80 moves generally perpendicularly with respect to the line A—A so that substantially no rotation of the second control member from the position illustrated in Figs. 1 to 4 and 6 occurs, this position of the second control member being referred to hereinafter as its first, or initial, position. As indicated by the dimensional arrow 82 in Fig. 7 of the drawings, a slight amount of rotation of the second control member 29 may occur as the second rotor 58 is rotated from its first position to one of its second positions, but this amount is so small as to be negligible, the amount shown in Fig. 7 being exaggerated for illustrative purposes.

Referring to Fig. 8 of the drawings, continued rotation of the second rotor 58 from one of its second positions to a corresponding one of a pair of third positions thereof, one of which third positions is shown in Fig. 8, results in substantial movement of the pivot pin 80 in a direction generally parallel to the line A—A connecting the axes of rotation of the second rotor and the second control member 29 so that the link 78 connecting the second control member to the second rotor rotates the second control member to the position illustrated in Fig. 8 of the drawings, which position is referred to hereinafter as the second, or advanced, position of the second control member. It will be noted that the second control member 29 will be rotated from its first position to the second position illustrated in Fig. 8 by the second rotor 58 irrespective of whether the second rotor is rotated from one of the second positions to the adjacent third position thereof in the clockwise direction or in the counterclockwise direction. In other words, although the direction of rotation of the first control member 25 is dependent upon the direction of rotation of the first rotor 57 as hereinbefore discussed, the direction of rotation of the second control member 29 is not dependent upon the direction of rotation of the second rotor 58 and the second control member will always be rotated into the second position illustrated in Fig. 8 of the drawings whenever the second rotor is rotated from one of its second positions to the adjacent third position thereof. The reason for this is, of course, that the link 78 always exerts a pull force on the second control member 29 tending to rotate this member in the counterclockwise direction, as viewed in Fig. 2 of the drawings, irrespective of whether the second rotor 58 is rotated in the clockwise or in the counterclockwise direction from its neutral position. However, the link 78 will always exert a push force on the second control member 29 when the second rotor 58 is moved from any position to its neutral position.

As previously discussed, in the particular embodiment of my invention presently under consideration, the first and second rotors 57 and 58 are adapted to be rotated from their first positions to one of their third positions through the intervening second position by the shaft 48 of the hydraulic slave unit 44, assuming that the first rotor is connected to the second by the disengageable means 62. As shown in Figs. 6 to 8 of the drawings, fluid pressure may be applied to the ends of the piston 49 of the hydraulic slave unit 44 to rotate the shaft 48 by means of a hydraulic master unit 86. A master unit of any suitable construction may be employed and the unit 86 is therefore not illustrated in detail. For example, the master unit 86 may comprise a handle 87 mounted on a shaft 88 which is geared to a piston (not shown) in substantially the same manner as the shaft 48 of the slave unit is geared to the piston 49 thereof. Thus, if the handle 87 is rotated in one direction, e. g., the direction indicated by the arrow 89, fluid pressure is developed in one end of the piston in the master unit 86 and may be applied to one end of the piston 49 in the slave unit 44 through a hydraulic line 90. Similarly, if the handle 87 is rotated in the opposite direction, fluid pressure will be developed at the opposite end of the piston in the master unit and may be applied to the opposite end of the piston 49 and the slave unit 44 through a hydraulic line 91. If desired, a compensator (not shown) may be interposed in the lines 90 and 91 between the master unit 86 and the slave unit 44 as is well known in the art.

Considering the operation of the control device 12 as used in connection with the engine 11, it will be assumed that the clutch of the engine is to be shifted from neutral into forward by rotating the clutch control lever 17 in the clockwise direction as viewed in Fig. 1 of the drawings. In this case, the solenoid 66 is de-energized so that the plunger 63 is inserted into the hole 65 in the first rotor 57 to connect the first rotor to the second rotor 58. With the solenoid 66 de-energized, it is merely necessary to rotate the actuating means 56, i. e., the first and second rotors 57 and 58, in the clockwise direction so that rotation of the first control member 25 in the counterclockwise direction is produced, and it will be assumed that such rotation of the actuating means may be obtained by rotating the handle 87 of the master unit 86 in the direction of the arrow 89. Thus, in order to shift the clutch of the engine 11 from neutral into forward, it is merely necessary to rotate the handle 87 of the master unit from the position illustrated in Fig. 6 of the drawings to that illustrated in Fig. 7 thereof, thus rotating the actuating means 56 from its first position to the second position illustrated in Fig. 7, the first rotor, in turn, rotating the first control member 25 from its first, or neutral, position to the second position which is illustrated in Fig. 7. Such rotation of the first control member 25 is communicated to the clutch control lever 17 by the connecting rod 26 so as to shift the clutch from neutral into forward.

Since, in rotating the first control member 25 from its neutral position to the second position illustrated in Fig. 7 of the drawings, the actuating means 56 produces substantially no movement of the second control member 29 as hereinbefore discussed, the position of the throttle of the engine 11 remains substantially unchanged as the clutch is shifted from neutral into forward. Tests have shown that the clutch may be shifted from neutral into forward, or into reverse, in the foregoing manner without increasing the speed of the engine 11 by more than approximately 25 to 50 R. P. M.

If, after having shifted the clutch from neutral into forward in the foregoing manner, it is desired to increase the speed of the engine 11, it is merely necessary to continue rotating the handle 87 of the master unit 86 in the same direction, i. e., in the direction of the arrow 89 in the particular example under consideration. Such continued rotation of the handle 87 of the master unit results in continued rotation of the actuating means 56 from the second position thereof illustrated in Fig. 7 of the drawings toward the third position thereof illustrated in Fig. 8. As previously discussed, rotation of the actuating means 56 from its second position toward the adjacent third position thereof produces no rotation of the first control member 25, and thus does not affect the position of the clutch control lever 17, but does result in rotation of the second control member 29 toward its second, or advanced, position. Such rotation of the second control member is communicated to the throttle of the engine 11 through the intervening linkage to advance the throttle. As will be apparent, any desired throttle setting may be obtained by selecting a suitable position for the handle 87 of the master unit 86.

Whenever it is desired to reduce the speed of the engine 11 and disengage the clutch, it is merely necessary to reverse the foregoing sequence of events. In other words, by rotating the handle 87 of the master unit 86 in the direction opposite to that indicated by the arrow 89, the actuating means 56 may be rotated from the third position thereof illustrated in Fig. 8 of the drawings to the second position thereof illustrated in Fig. 7 to retard the throttle and reduce the speed of the engine substantially to idling speed, and may subsequently be rotated from the second position illustrated in Fig. 7 to its first position to rotate the first control member 25 to its first, or neutral, position and thus shift the clutch from forward to neutral.

The control device 12 operates in a similar but opposite manner when the clutch is to be shifted from neutral into reverse and the speed of the engine 11 subsequently increased and its operation in this respect will not be discussed in detail.

If it is desired to advance the throttle of the engine 11 without shifting the clutch thereof from neutral into forward or reverse, as in warming up the engine, for example, this may be accomplished by energizing the solenoid 66 so as to disengage the clutch means 62, thereby disconnecting the first rotor 57 from the second rotor 58. Thus, the second rotor 58 may be rotated to change the position of the throttle of the engine without rotating the first rotor 57 controlling the operation of the clutch. If it is subsequently desired to operate the clutch of the engine, it is merely necessary to re-engage the clutch means 62 so as to reconnect the first rotor 57 to the second rotor 58. In order to insure re-engagement of the clutch means 62, the second rotor 58 carries stops, exemplified as pins 92, which are adapted to engage the bolt 73 carrying the roller 72 on the first rotor 57 so as to align the hole 65 in the first rotor with the plunger 63 of the clutch means.

Although the control device 12 includes the clutch means 62 for permitting operation of the throttle of the engine 11 independently of the clutch thereof, there are instances wherein such independent operation of the throttle is not necessary, and in Fig. 9 of the drawings I show an embodiment of my invention wherein no means for disengaging the clutch actuating mechanism is provided. Referring to Fig. 9, it will be noted that I have eliminated the second rotor 58 and have fixed the first rotor 57 on the shaft 48, the second control member 29 for the throttle of the engine being connected to the first rotor 57 in this case. More specifically, the link 78 connects the second control member 29 for the throttle directly to the first rotor 57. The operation of the embodiment of my invention which is shown in Fig. 9 of the drawings is identical to that of the embodiment illustrated in Figs. 1 to 8, except for the fact that independent operation of the throttle cannot be attained, and will not be discussed in detail.

Although I have described embodiments of my invention which are operable by a hydraulic motor, it will be understood that various other operating means may be employed. For example, in Fig. 10 of the drawings, I show the shaft 48 of the control device 12 as being adapted to be rotated by a sprocket 95 having a chain 96 trained therearound. Various other operating means for rotating the shaft 48 may also be employed without departing from the spirit of the invention.

It will thus be apparent that my invention provides a device which may be employed to control the positions of two separate elements by movement of a single control means and, more particularly, which may be employed to first move one of the elements, e. g., the clutch control lever 17, from one position to another substantially without moving the second element, e. g., the throttle control lever 19, and which may be employed to subsequently move the second element from one position to another without moving the first element. Also, by disengaging the clutch means 62, one of the elements, e. g., the throttle control lever 19, may be moved independently of the other. Although I have considered my invention herein as employed to control the positions of the clutch and throttle of an engine and have disclosed exemplary embodiments of the invention in this connection for purposes of illustration, it will be understood that the invention is susceptible of various other applications and that various changes, modifications and substitutions may be incorporated in the specific embodiments disclosed all without necessarily departing from the spirit of the invention. Consequently, I hereby reserve the right to the protection afforded by the full scope of the appended claims.

I claim as my invention:

1. In a control device, the combination of: first and second control members each movable between first and second positions; actuating means operatively connected to said control members for first moving said first control member from its first position to its second position substantially without moving said second control member, and for subsequently moving said second control member from its first position to its second position substantially without moving said first control member and clutch means for disconnecting part of said actuating means from said first control member to render said actuating means inoperative to move said first control member, whereby to permit moving said second control member independently of said first control member.

2. In a control device, the combination of: first and second control members each rotatable between first and second positions; actuating means rotatable from a first position to a third position through a second position, said actuating means including relatively rotatable first and second actuating members; clutch means for releasably connecting said first actuating member to said second actuating member so as to render said first actuating member rotatable with said second actuating member; means connected to said second actuating member for rotating said actuating means; means carried by said first actuating member and adapted to operatively engage said first control member for rotating said first control member from its first position to its second position as said actuating means is rotated from its first position to its second position; means connecting said second control member to said second actuating member for rotating said second control member from its first position to its second position as said actuating means is rotated from its second position to its third position; and means for disengaging said clutch means.

3. In a device of the character described, the combination of: Geneva stop means including a first control member which is rotatable between first and second positions, and including actuating means which is rotatable from a first position to a third position through a second position for rotating said first control member from its first position to its second position as said actuating means is rotated from its first position to its second position; a second control member rotatable between first and second positions; means connecting said second control member to said actuating means for rotating said second control member from its first position to its second position as said actuating means is rotated from its second position to its third position, said means connecting said second control member to said actuating means including a link pivotally connected to said actuating means at a first pivot point and pivotally connected to said second control member at a second pivot point, said first pivot point being located substantially on a line which is normal to the axis of rotation of said actuating means and which extends through said second pivot point when said actuating means is in its first position so that said first pivot point moves generally perpendicularly with respect to said line as said actuating means is rotated from its first position toward its second position, whereby substantially no rotation of said second control member occurs as said actuating means is rotated from its first position toward its second position; and means for rotating said actuating means.

4. In a control device, the combination of: Geneva stop means comprising a first control member which is rotatable between first and second positions and a first actuating member which is rotatable from a first position to a third position through a second position, said first actuating member being adapted to rotate said first control member from its first position to its second position as it is rotated from its first position to its second position; a second control member rotatable between first and second positions; a second actuating member rotatable from a first position to a third position through a second position; link means pivotally connected to said second control member and to said second actuating member for rotating said second control member from its first position to its second position as said second actuating member is rotated from its second position to its third position; means for rotating said first actuating member; and means for rotating said second actuating member.

5. A control device as set forth in claim 4 wherein said means for rotating said first actuating member comprises clutch means for connecting said first actuating member to said second actuating member so as to render said first actuating member rotatable with said second actuating member.

6. A control device as set forth in claim 5 including means for disengaging said clutch means so as to permit rotation of said second actuating member and said second control member independently of said first actuating member and said first control member.

7. In a control device of the character described, the combination of: first and second control members each rotatable between first and second positions, said first control member being provided with a notch therein; actuating means rotatable from a first position to a third position through a second position about an axis substantially parallel to the axis of rotation of said second control member; a first actuating element carried by said actuating means and receivable in said notch when said actuating means is between its first and second positions for rotating said first control member from its first position to its second position as said actuating means is rotated from its first position to its second position, said first actuating element being withdrawable from said notch as said actuating means is rotated from its second position toward its third position; a second actuating element pivotally connected to said actuating means and said second control member at first and second pivot points, respectively, said first pivot point being located substantially on a line which is normal to the axis of rotation of said actuating means and which extends through said second pivot point when said actuating means is in its first position so that said first pivot point moves generally perpendicularly with respect to said line when said actuating means is rotated from its first position toward its second position, whereby substantially no rotation of said second control member occurs as said actuating means is rotated from its first position toward its second position; and means for rotating said actuating means.

8. In a control device, the combination of: a shaft rotatable from a first position to a third position through a second position; Geneva stop means including a first control member rotatable between first and second positions and including actuating means carried by said shaft and rotatable therewith, said actuating means being adapted to rotate said first control member from its first position to its second position as said shaft is rotated from its first position to its second position; a second control member rotatable from a first position to a second position; and link means pivotally connected to said second control member and to said actuating means for rotating said second control member from its first position to its second position as said shaft is rotated from its second position to its third position.

9. A control device according to claim 8 including means for rotating said shaft.

10. In a control device, the combination of: a shaft rotatable from a first position to a third position through a second position; first and second control members each rotatable between first and second positions; relatively rotatable first and second actuating members carried by said shaft, said second actuating member being fixed on said shaft; clutch means for releasably connecting said first actuating member to said second actuating member to render said first actuating member rotatable with said shaft; means on said first actuating member for rotating said first control member from its first position to its second position as said shaft is rotated from its first position to its second position; means connecting said second actuating member and said second control member for rotating said second control member from its first position to its second position as said shaft is rotated from its second position to its third position; and means for rotating said shaft.

11. A control device as set forth in claim 10 including means for disengaging said clutch means.

12. In an apparatus for controlling the position of a clutch and a throttle of an engine, the combination of: Geneva stop means comprising a first control member rotatable between first and second positions and actuating means rotatable from a first position to a third position through a second position, said actuating means being adapted to rotate said first control member from its first position to its second position as it is rotated from its first position to its second position; a second control member rotatable between first and second position; link means pivotally connected to said second control member and to said actuating means for rotating said second control member from its first position to its second position as said actuating means is rotated from its second position to its third position; means for connecting said first control member to the clutch of the engine; means for connecting said second control member to the throttle of the engine; and means for rotating said actuating means from its first position to its second position and subsequently from its second position to its third position, whereby said first control member is rotated from its first position to its second position to operate the clutch of the engine and whereby said second control member is subsequently rotated from its first position to its second position to operate the throttle of the engine.

13. In a control device, the combination of: a support; a first control member carried by said support and movable relative thereto in either of two directions from a neutral position to either of two operating positions; a second control member carried by said support and movable relative thereto in one direction only from a neutral position to an operating position; and actuating means carried by said support and operatively connected to said control members for first moving said first control member from its said neutral position to one or the other of its said operating positions substantially without moving said second control member, and for subsequently moving said second control member from its said neutral position to its said operating position substantially without moving said first control member.

14. In a control device, the combination of: a support; a first control member carried by said support and movable relative thereto in either of two directions from a neutral position to either of two operating positions; a second control member carried by said support and movable relative thereto in one direction only from a neutral position to an operating position; a first actuating member carried by said support and movable relative thereto from a neutral position to either of two advanced positions, there being an intermediate position for said first actuating member between its said neutral position and each of its said advanced positions; a second actuating member carried by said support and movable relative thereto from a neutral position to either of two advanced positions, there being an intermediate position for said second actuating member between its said neutral position and each of its said advanced positions; means operatively connecting said first control member to said first actuating member for moving said first control member from its said neutral position to one of its said operating positions in response to movement of said first actuating member from its said neutral position to one of its said intermediate positions and for moving said first control member from its said neutral position to the other of its said operating positions in response to movement of said first actuating member from its said neutral position to the other of its said intermediate positions; means operatively connecting said second control member to said second actuating member for moving said second control member from its said neutral position to its said operating position in response to movement of said second actuating member from either of its said intermediate positions to the corresponding one of its said advanced positions; means for moving said second actuating member from its said neutral position to either one or the other of its said advanced positions through the corresponding one of its said intermediate positions; and means for moving said first actuating member from its said neutral position to either of its said advanced positions through the corresponding one of its said intermediate positions concurrently with said second actuating member.

15. A control device according to claim 14 wherein the means last defined comprises clutch means for disengageably connecting said first actuating member to said second actuating member.

OTTMAR A. KEHLE.

REFERENCES CITED

The following references are of record in the file of this patent:

UNITED STATES PATENTS

| Number | Name | Date |
|---|---|---|
| 621,193 | Wilson | Mar. 14, 1899 |
| 1,089,615 | Wyman | Mar. 10, 1914 |
| 2,071,063 | Florez | Feb. 16, 1937 |